US005663545A

United States Patent [19]

Marquiss

[11] Patent Number: 5,663,545

[45] Date of Patent: Sep. 2, 1997

[54] LABWARE IDENTIFICATION SYSTEM

[75] Inventor: Samuel A. Marquiss, Santa Clara, Calif.

[73] Assignee: LJL Biosystems Inc., Sunnyvale, Calif.

[21] Appl. No.: 518,484

[22] Filed: Aug. 23, 1995

[51] Int. Cl.[6] .............................. G06F 17/00; B01L 9/00

[52] U.S. Cl. .............................. 235/375; 422/104

[58] Field of Search .............................. 235/375, 462, 235/486, 383, 385; 422/104, 65, 119

[56] References Cited

U.S. PATENT DOCUMENTS

| | | | |
|---|---|---|---|
| 3,680,967 | 8/1972 | Engelhardt | 235/487 |
| 4,055,396 | 10/1977 | Meyer et al. | 422/104 |
| 4,751,186 | 6/1988 | Baisch et al. | 422/104 |
| 5,008,082 | 4/1991 | Shaw | 422/65 |
| 5,348,705 | 9/1994 | Koreyasu et al. | 422/65 |
| 5,357,095 | 10/1994 | Weyrauch et al. | 235/494 |
| 5,401,110 | 3/1995 | Neeley | 235/375 |
| 5,417,922 | 5/1995 | Markin et al. | 422/65 |
| 5,420,408 | 5/1995 | Weyrauch et al. | 235/454 |
| 5,427,743 | 6/1995 | Markin | 422/104 |
| 5,450,385 | 9/1995 | Ellis et al. | 235/385 |
| 5,578,272 | 11/1996 | Koch et al. | 422/104 |
| 5,597,733 | 1/1997 | Bell et al. | 436/54 |

FOREIGN PATENT DOCUMENTS

| | | | |
|---|---|---|---|
| 4-9668 | 1/1992 | Japan | 422/65 |

*Primary Examiner*—Donald T. Hajec
*Assistant Examiner*—Mark Tremblay
*Attorney, Agent, or Firm*—Lumen Intellectual Property Services

[57] ABSTRACT

The invention presents a system for automatically identifying labware and sample containers. Labeled sample containers are inserted into the reception slots of a labeled labware. A sample condition label is affixed below each reception slot. The sample condition label is covered by the sample container when the sample container is inserted into the reception slot. An exposed sample condition label indicates the absence of a sample container in that reception slot. The labware containing the sample containers is installed on a labware holder having a labware condition label affixed to its surface. The labware condition label is covered by the labware when the labware is installed on the labware holder. An exposed labware condition label indicates the absence of a labware on the labware holder. The label information is read by an optical reader attached to a motorized track. Both the optical reader and the motorized track are connected to a data processor. The data processor stores the label information and controls the position of the optical reader.

16 Claims, 4 Drawing Sheets

LABWARE IDENTIFICATION SYSTEM

BACKGROUND—FIELD OF THE INVENTION

The present invention relates Generally to the field of chemical analysis, and in particular to an identification system for labware and sample containers used in conjunction with a chemical analysis instrument.

BACKGROUND—DESCRIPTION OF PRIOR ART

Automated chemical analysis instruments have been developed for biochemical and chemical analysis of samples. Laboratories generally use standard sample containers, such as draw tubes, test tubes, and cuvettes to hold the samples they wish to analyze. These sample containers are placed in a labware, such as a test tube rack or a bottle holding tray, and this labware is placed on a labware holder. The labware holder holds the labware for the analysis instrument so that the instrument can perform analyses on the samples.

These chemical analysis instruments lack a flexible and automated means for identifying the presence and contents of labware and sample containers placed in them. Typically, the analysis instrument requires the use of a fixed type of labware and sample container. If the labware and sample container are not of this fixed type, the instrument operator must manually identify the labware type and the number of samples it contains.

U.S. Pat. No. 5,420,408 to Weyrauch et al. discloses a method of automatically identifying labeled reagent bottles and sample containers to be used in an instrument performing a chemical analysis. However, the labware in Weyrauch must be of a fixed type and positioned on the labware holder in an exact orientation. The labware is a circular tray, rotatably mounted about a first vertical axis. This first vertical axis must be parallel to a second vertical axis belonging to a turntable utilized by the analysis instrument. Thus, the automatic identification method of Weyrauch only works for one type of labware and there is only one possible way to install the labware in the analysis instrument.

Weyrauch also shows a barcode reader for reading labeled sample tubes introduced into the analysis instrument. However, these sample tubes are introduced manually by the instrument operator after the operator has already installed the labware in the analysis instrument. The instrument operator must perform these two separate steps to ensure accurate identification of the labware and sample tubes.

Further, Weyrauch's method utilizes four different optical scanning devices to identify the presence and contents of the labeled reagent bottles and sample tubes. The barcode reader only reads the labeled sample tubes manually introduced by the instrument operator. A separate line of sight optical sensor tests for the presence of containers on the labware tray and a third scanning device reads the labels on these containers. Finally, a fourth optical scanner reads the bottom surface of labeled reagent bottles. Utilizing four separate optical scanning devices is a complicated and expensive method of identifying the labware and sample containers placed in an analysis instrument.

Thus, none of the presently available identification systems can automatically identify more than one type of labware and sample container installed in a chemical analysis instrument. The presently available systems all require labware of a fixed type, or they require that an instrument operator manually identify the labware type and the number of samples it contains.

OBJECTS AND ADVANTAGES OF THE INVENTION

Accordingly, one object and advantage of the present invention is to provide a system that can automatically identify any type of labware and sample container. A second object and advantage is to provide a system where the sample containers can be installed in the labware before the labware is installed in an analysis instrument. Further, the system can automatically identify the number and configuration of sample containers within the labware. Another object and advantage of the invention is to provide a system that requires only one optical reader to identify the presence and contents of labware and sample containers.

These and other objects and advantages will become more apparent after consideration of the ensuing description and the accompanying drawings.

SUMMARY OF THE INVENTION

The present invention describes a labware identification system for automatically identifying labware and sample containers. The sample containers are affixed with sample identification labels that contain barcode information, character information, or a combination of both barcode and character information. The labeled sample containers are inserted into the reception slots of a labware.

The labware has a sample condition label positioned near each reception slot. When the sample container is present in the reception slot, the sample condition label is covered by the sample container and the sample identification label is exposed. When the sample container is absent from the reception slot, the sample condition label is exposed. The labware also has a labware identification label affixed to its outer surface. The labware identification label contains barcode information, character information, or a combination of both barcode and character information.

The labware is installed on a labware holder having a locating means for accurately positioning the labware on the labware holder. The labware holder further has a labware condition label affixed to its outer surface. When the labware is positioned in the labware holder, the labware condition label is covered by the labware and the labware identification label is exposed. When the labware is absent from the labware holder, the labware condition label is exposed.

The label information is read by an optical reader which is attached to a data processor. The data processor processes and stores the label information read by the optical reader.

The particulars relating to the present identification system are explained in detail in the following description and accompanying drawings.

DESCRIPTION

Figure 1:
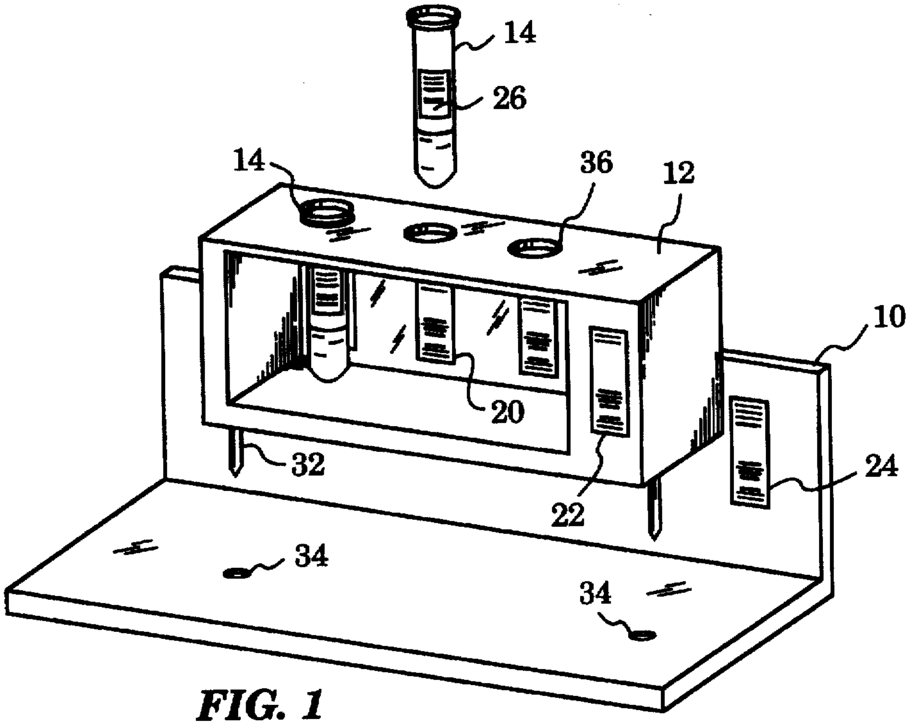
FIG. 1 is a perspective view of a labware identification system according to the invention.
Figure 2:
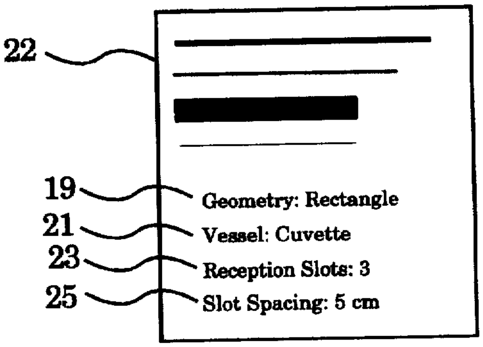
FIG. 2 is a plan view of a labware identification label.
Figure 3:
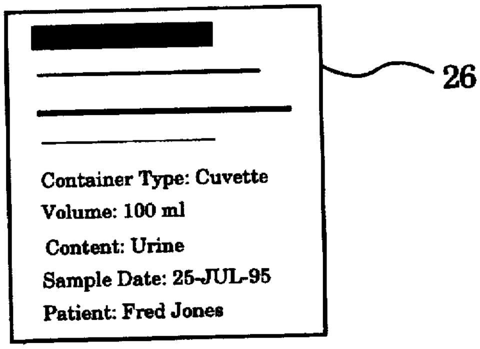
FIG. 3 is a plan view of a sample identification label.
Figure 4:
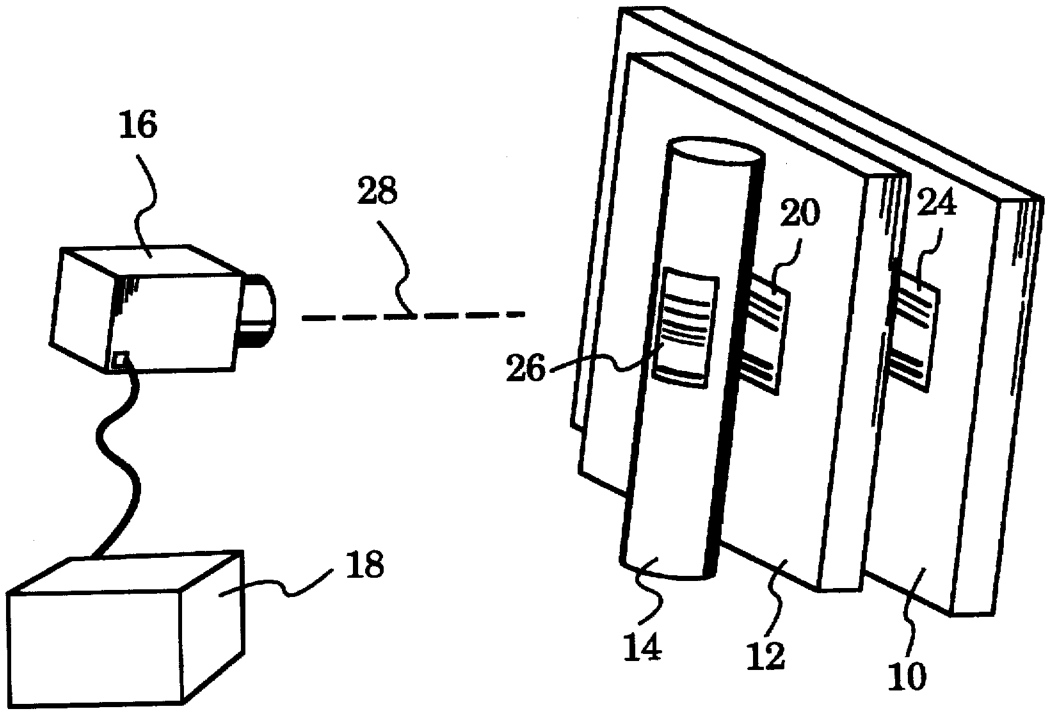
FIG. 4 is a perspective view of an optical reader and its line of sight to various labels.

The preferred embodiment of the identification system is shown in FIGS. 1–4. The identification system includes a labware holder 10 having a horizontal surface and a vertical surface which are joined at the back edge of the horizontal surface. Two indexing holes 34 are cut into the horizontal surface of labware holder 10. A labware 12 has two indexing pins 32 attached to its bottom surface. The two indexing pins 32 are spaced at such a distance from each other that they fit into indexing holes 34 when labware 12 is placed on labware holder 10.

The identification system further includes an optical reader 16. Optical reader 16 is a type of optical scanning device that can read barcode information, character information, or both barcode and character information. According to one embodiment, optical reader 16 is attached to a conventional motorized track (not shown) which is positioned in front of labware holder 10. The motorized track extends along the front horizontal edge of labware holder 10. Optical reader 16 is connected to a data processor 18. The motorized track is also connected to data processor 18 such that data processor 18 can control the movements of optical reader 16 on the motorized track. Alternatively, optical reader 16 is stationary and labware holder 10 is made to move. The choice of mechanisms and methods for producing relative motion between optical reader 16 and labware holder 10 is left up to the artisan.

A labware condition label 24 is affixed to the inner vertical surface of labware holder 10. Labware condition label 24 is positioned such that the line of sight 28 from optical reader 16 to labware condition label 24 is blocked by labware 12 when it is placed on labware holder 10.

Labware 12 is a rectangular rack with an open front except for a small front surface area to which a labware identification label 22 is affixed. Labware 12 includes three reception slots 36 cut into its top surface. Reception slots 36 are circular holes of the correct diameter to receive and hold a sample container 14. Sample container 14 has a sample identification label 26 affixed to its outer surface. Sample identification label 26 is positioned on sample container 14 such that the entire area of sample identification label 26 is visible through the open front of labware 12 when sample container 14 is positioned in reception slot 36.

Labware 12 further includes a sample condition label 20 positioned on its inner vertical surface below each reception slot 36. Sample condition label 20 is positioned below reception slot 36 such that the line of sight 28 from optical reader 16 to sample condition label 20 is blocked by sample identification label 26 when sample container 14 is present in reception slot 36.

Labware identification label 22 and sample identification label 26 are imprinted with either barcode information, character information, or a combination of barcode and character information. In the preferred embodiment shown in FIG. 2, labware identification label 22 has a barcode as well as four character fields. These four character fields are a geometry field 19, a vessel field 21, a reception slot field 23, and a slot spacing field 25.

In the operation of the preferred embodiment, optical reader 16 scans line of sight 28. If labware 12 is not present in labware holder 10, then optical reader 16 will only read labware condition label 24. Optical reader 16 will relay the label information read from labware condition label 24 to data processor 18. Data processor 18 will store the information that there is no labware 12 present on labware holder 10.

When labware 12 is installed on labware holder 10, the indexing pins 32 are inserted into indexing holes Labware 12 will now block the line of sight 28 from the optical reader 16 to the labware condition label 24, so that optical reader 16 will not read labware condition label Instead, optical reader 16 reads the barcode, geometry field 19, vessel field 21, reception slot field 23, and slot spacing field 25 imprinted on labware identification label 22.

Data processor 18 receives and processes this label information from optical reader 16. Using the information received from geometry field 19, vessel field 21, reception slot field 23, and slot spacing field 25, data processor 18 orders the motorized track to move optical reader 16 to a position in front of the first reception slot 36.

If no sample container 14 is present in reception slot 36, optical reader 16 will only read the label information from sample condition label 20 below that reception slot 36, and relay this label information to data processor 18. Data processor 18 will then order the motorized track to move optical reader 16 to a position in front of the next reception slot 36.

If sample container 14 is present in reception slot 36, the line of sight 28 from optical reader 16 to sample condition label 20 will be blocked by sample identification label 26. Optical reader 16 will not read sample condition label 20 but will read sample identification label 26, and relay the label information to data processor 18. Data processor 18 will then order the motorized track to move optical reader 16 to a position in front of the next reception slot 36.

Optical reader 16 will repeat the process of reading either the sample condition label 20 or the sample identification label 26 for the next reception slot 36 and relay the label information to data processor 18. Data processor 18 will then order the motorized track to move optical reader 16 to a position in front of the third reception slot 36.

The cycle of reading the label information under a reception slot 36 and moving optical reader 16 to the next reception slot 36 continues until optical reader 16 has read and relayed the label information for the final reception slot 36 in labware 12. Data processor 18 knows optical reader 16 is positioned in front of the final reception slot 36 from the label information in reception slot field 23 already received by data processor 18. Once optical reader 16 reads and relays the label information from the final reception slot 36, data processor 18 orders the motorized track to move optical reader 16 to its starting position in front of labware identification label 22. Data processor 18 will inventory, store, and track all the label information received from optical reader 16 throughout the operation.

Figure 5:
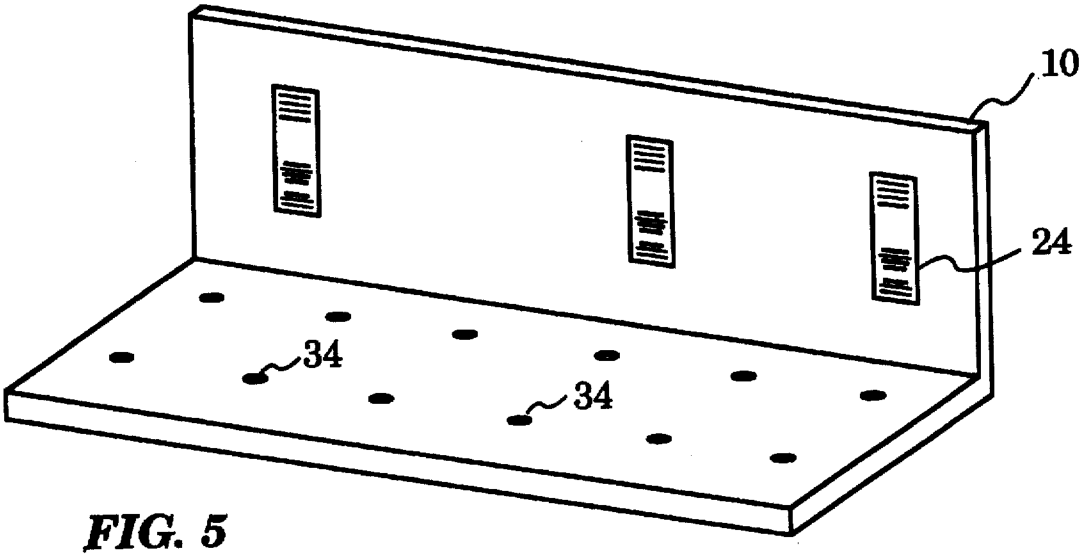
FIG. 5 is a perspective view of a labware holder.

A second embodiment of the identification system is shown in FIG. 5. Labware holder 10 has three labware condition labels 24 affixed to its vertical surface. Labware holder 10 also has twelve indexing holes 34 cut into its horizontal surface.

The operation of the second embodiment of the identification system is the same as the operation of the first embodiment except that up to three labwares 12 may be installed on labware holder 10 at the same time. Additionally, labware 12 may be installed in the front row of indexing holes 34 or in the back row of indexing holes 34. In either case, optical reader 16 successively performs the operations described in the first embodiment on each of the three labwares 12 installed on labware holder 10.

Figure 6:
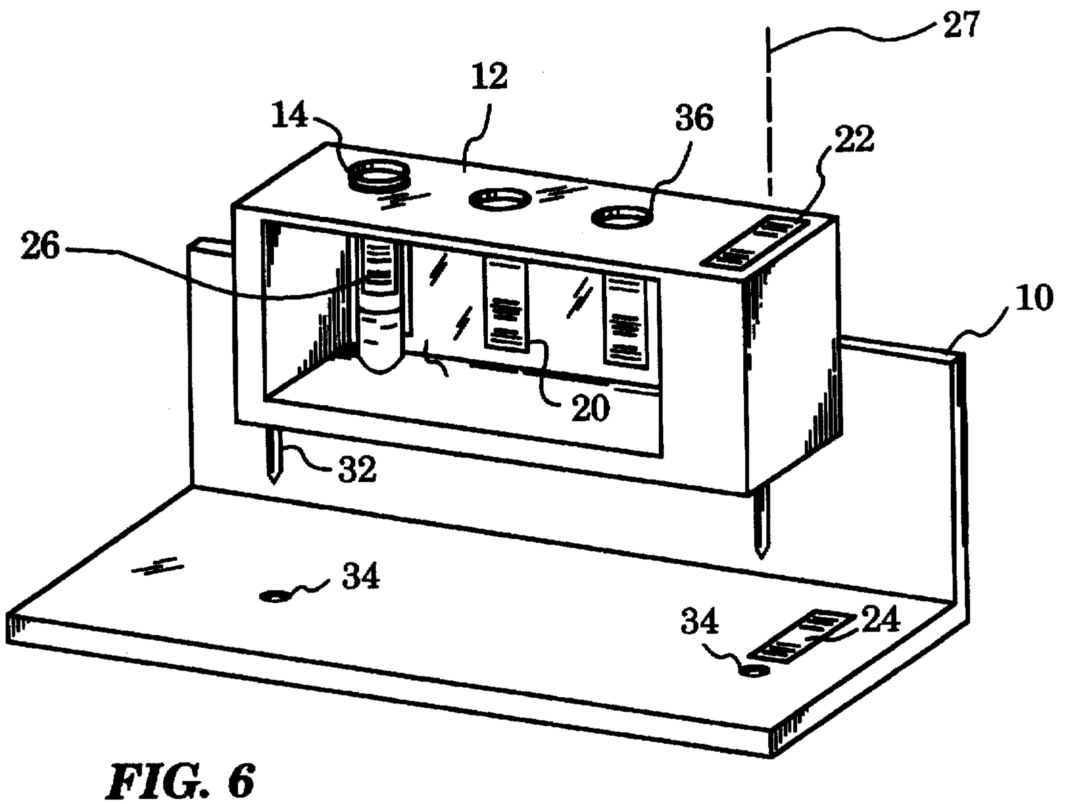
FIG. 6 is a perspective view of a labware identification system according to the invention.
Figure 7:
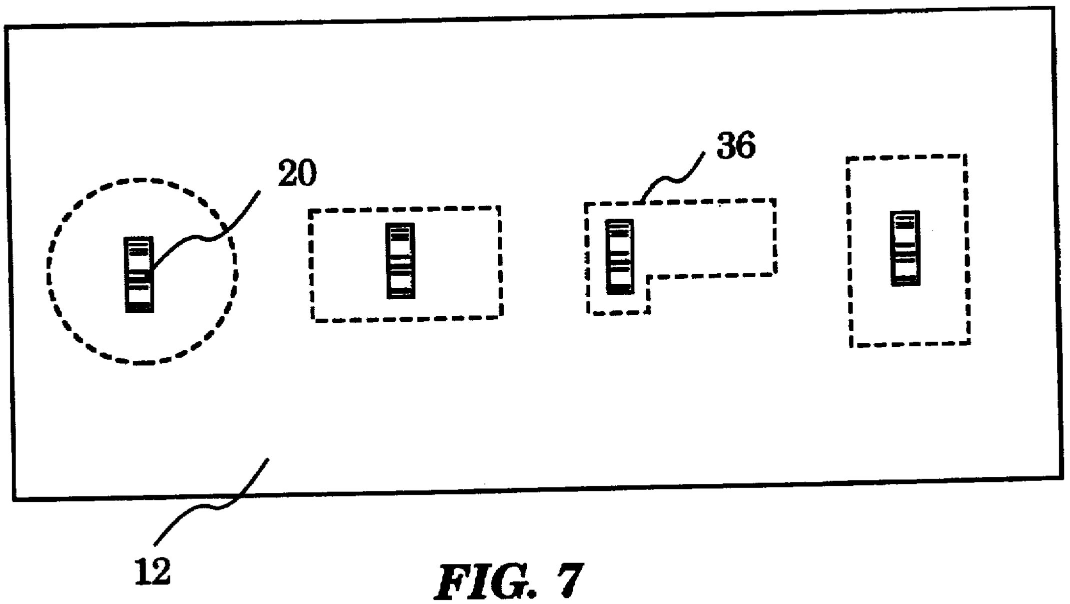
FIG. 7 is a plan view of a labware, reception slots, and sample condition labels.

A third embodiment of the identification system is shown in FIGS. 6–7. Reception slots 36 vary in size and geometrical shape. Additionally, sample condition label 20 is affixed to the inner bottom surface of labware 12 and labware condition label 24 is affixed to the horizontal surface of labware holder 10. Labware identification label 22 is affixed to the outer top horizontal surface of labware 12. A second optical reader (not shown) is now positioned above labware 12. The second optical reader is connected to data processor 18. Labware condition label 24 is positioned such that the vertical line of sight 27 from the second optical reader to labware condition label 24 is blocked by labware 12 when labware 12 is placed on labware holder 10.

The operation of the third embodiment of the identification system differs from the operation of the first embodiment in that reception slots 36 receive sample containers 14 of different sizes and shapes corresponding to the sizes and shapes of reception slots 36. Additionally, the second optical reader reads labware condition label 24 or labware identification label 22 through a vertical line of sight 27 and relays the label information to data processor 18. Optical reader 16 reads the sample condition labels 20 and sample identification labels 26 in exactly the operational manner described in the preferred embodiment. All other operations are accomplished in the same manner as the operations described in the preferred embodiment.

Figure 8:
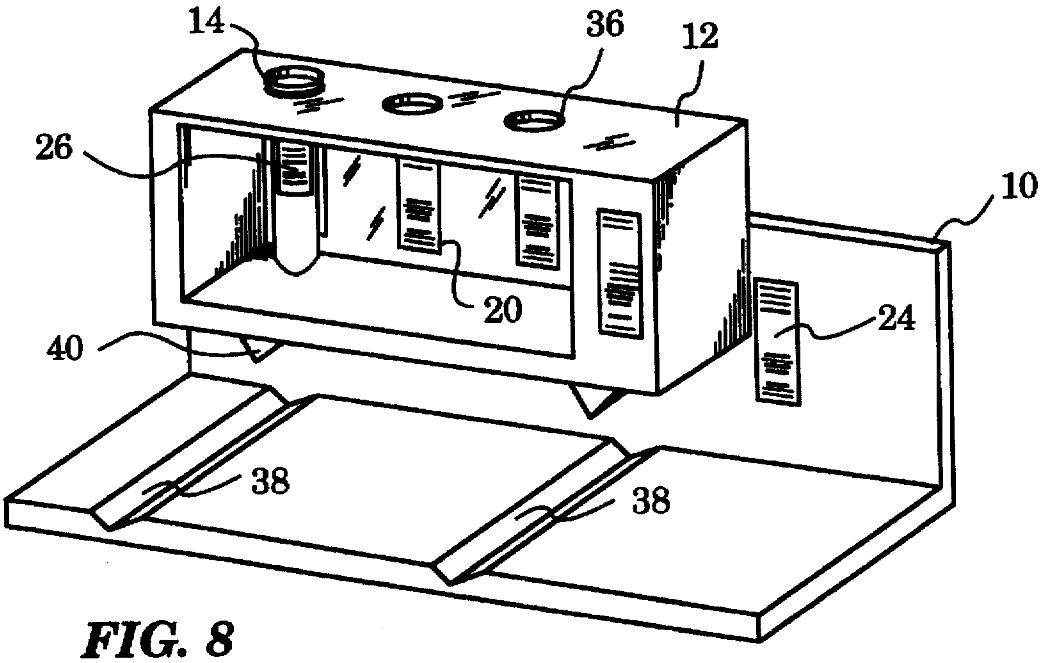
FIG. 8 is a perspective view of a labware identification system with grooves on a labware holder and ridges on a labware.
Figure 9:
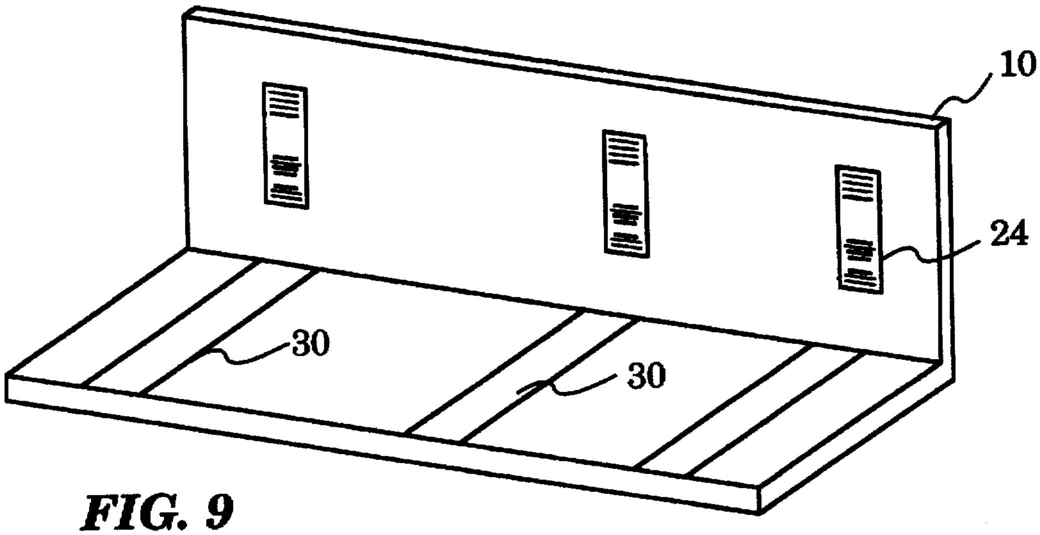
FIG. 9 is a perspective view of a labware identification system with positioning lines on a labware holder.

FIG. 8 and FIG. 9 show embodiments of the identification system that have different means for positioning labware 12 on labware holder 10. In FIG. 8, labware holder 10 includes two grooves 38 cut into its horizontal surface. The labware 12 has two ridges 40 on its bottom surface. Ridges 40 are spaced on labware 12 such that they would fit into grooves 38 when labware 12 is placed on labware holder 10. In FIG. 9, the labware holder 10 includes two positioning lines 30 marked on its horizontal surface.

The operation of the embodiments shown in FIG. 8 and FIG. 9 is identical to the operation of the first embodiment except for the following differences. In FIG. 8, ridges 40 are placed into grooves 38 when labware 12 is installed on labware holder 10. In FIG. 9 positioning lines 30 indicate proper placement of labware 12 when it is installed on labware holder 10.

SUMMARY, RAMIFICATIONS, AND SCOPE

Thus, the present invention provides an identification system that can automatically identify any type of labware and sample container installed in an analysis instrument. Additionally, the sample containers can be installed in the labware before the labware is installed in the analysis instrument. Further, the identification system can automatically identify the number and configuration of sample containers within the labware, using only one optical reader in the preferred embodiment.

Although the description above contains many specifities, these should not be construed as limiting the scope of the invention but merely as providing illustrations of some of the presently preferred embodiments. For example, the position of the optical reader can be changed by means other than a motorized track, such as a mechanical arm. Alternatively, the optical reader could remain stationary while the labware moved. The labware could have different shapes than the rectangular rack described, such as a round carousel. The labware holder need not be two flat sheets joined normally. It could be any shape that would hold the labware for the analysis instrument. Additionally, the system can be used without the analysis instrument to inventory labware and sample containers. The labels described could hold more or different information than the information illustrated. Any barcode, dot pattern, or character pattern could be imprinted on the labels to aid identification.

Therefore, the scope of the invention should be determined, not by examples given, but by the appended claims and their legal equivalents.

We claim:

1. A labware identification system comprising:

a) a sample container, said sample container having a sample identification label thereon;

b) a labware having a reception slot for keeping said sample container, said labware further having a sample condition label positioned near said reception slot such that when said sample container is present in said reception slot said sample condition label is covered up by said sample container and said sample identification label is exposed, and when said sample container is absent from said reception slot, said sample condition label is exposed, said labware further having thereon a labware identification label;

c) a labware holder having a locating means for positioning said labware on said labware holder, said labware holder further having a labware condition label thereon such that when said labware is positioned in said labware holder, said labware condition label is covered and said labware identification label is exposed, and when said labware is absent from said labware holder, said labware condition label is exposed; and d) an optical reader for reading label information from said sample identification label, said sample condition label, said labware identification label, and said labware condition label; and e) a data processor for processing said label information read by said optical reader.

2. The labware identification system of claim 1 wherein said sample identification label and said sample condition label are arranged along the same line of sight from said optical reader.

3. The labware identification system of claim 1 wherein said labware has a plurality of reception slots for keeping a plurality of sample containers.

4. The labware identification system of claim 3 wherein said plurality of reception slots are of a uniform size and shape.

5. The labware identification system of claim 3 wherein said plurality of reception slots vary in size and shape such that they can keep a plurality of sample containers of varied size and shape.

6. The labware identification system of claim 1 wherein said sample container is a test tube.

7. The labware identification system of claim 1 wherein said data processor is an inventory unit for inventorying, storing, and tracking said label information.

8. The labware identification system of claim 1 wherein said locating means comprises a plurality of indexing pins attached to said labware and a plurality of indexing holes in said labware holder, said plurality of indexing holes receiving said plurality of indexing pins when said labware is positioned on said labware holder.

9. The labware identification system of claim 1 wherein said locating means comprises a groove on said labware holder and a ridge on said labware, said groove receiving said ridge when said labware is positioned on said labware holder.

10. The labware identification system of claim 1 wherein said locating means comprises one or more positioning lines on said labware holder.

11. The labware identification system of claim 1 wherein said optical reader can read barcode information.

12. The labware identification system of claim 1 wherein said optical reader can read character information.

13. The labware identification system of claim 1 wherein said labware identification label contains barcode information.

14. The labware identification system of claim 1 wherein said labware identification label contains character information.

15. The labware identification system of claim 1 wherein said sample identification label contains barcode information.

16. The labware identification system of claim 1 wherein said sample identification label contains character information.

* * * * *